United States Patent
Taniguchi (10) Patent No.: US 11,006,239 B2
(45) Date of Patent: May 11, 2021

(54) ELECTRONIC APPARATUS, SYSTEM INCLUDING ELECTRONIC APPARATUS, POSITION ESTIMATION METHOD

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 317 days.

(21) Appl. No.: 16/059,996

(22) Filed: Aug. 9, 2018

(65) Prior Publication Data
US 2019/0281577 A1 Sep. 12, 2019

(30) Foreign Application Priority Data
Mar. 12, 2018 (JP) ............................ JP2018-044636

(51) Int. Cl.
*H04W 4/02* (2018.01)
*H04B 17/318* (2015.01)
*G01S 5/10* (2006.01)
*G01S 5/02* (2010.01)

(52) U.S. Cl.
CPC ............... *H04W 4/023* (2013.01); *G01S 5/10* (2013.01); *H04B 17/318* (2015.01); *G01S 5/0249* (2020.05)

(58) Field of Classification Search
None
See application file for complete search history.

(56) References Cited

U.S. PATENT DOCUMENTS

| | | | |
|---|---|---|---|
| 2007/0191022 A1 | 8/2007 | Yanagihara | |
| 2014/0148195 A1* | 5/2014 | Bassan-Eskenazi | G06K 7/10297 455/456.1 |
| 2016/0124071 A1* | 5/2016 | Baxley | G06K 9/00771 348/143 |
| 2019/0018130 A1* | 1/2019 | Griggs | G01S 13/66 |

FOREIGN PATENT DOCUMENTS

| | | |
|---|---|---|
| JP | 2005-291793 A | 10/2005 |
| JP | 2007-218614 A | 8/2007 |
| JP | 2017-138262 A | 8/2017 |

* cited by examiner

*Primary Examiner* — Erin F Heard
*Assistant Examiner* — Donald H B Braswell
(74) *Attorney, Agent, or Firm* — Foley & Lardner LLP (57) ABSTRACT

An electronic apparatus includes communication circuitry and processing circuitry. The communication circuitry receives first and second wireless signals from a first terminal when the electronic apparatus reaches first and second measurement points. The communication circuitry receives third and fourth wireless signals from a second terminal when the electronic apparatus reaches third and fourth measurement points. The processing circuitry estimates one or more first candidates of a position of the first terminal and one or more second candidates of a position of the second terminal. The processing circuitry specifies the position of the first terminal and the position of the second terminal.

11 Claims, 8 Drawing Sheets

ELECTRONIC APPARATUS, SYSTEM INCLUDING ELECTRONIC APPARATUS, POSITION ESTIMATION METHOD

CROSS-REFERENCE TO RELATED APPLICATIONS

This application is based upon and claims the benefit of priority from the Japanese Patent Application No. 2018-044636, filed Mar. 12, 2018, the entire contents of which are incorporated herein by reference.

FIELD

Embodiments described herein relate to an electronic apparatus, a system including electronic apparatus, a position estimation method.

BACKGROUND

A method for estimating a position of a terminal by using a Received Signal Strength Indicator (RSSI) between multiple wireless terminals is already known. This type of position estimation system is constructed, for example, by multiple electronic apparatuses (reference terminals) positioned at already-known coordinates, and multiple terminals (target terminals) positioned at unknown coordinates. The positions of target terminals are first estimated coarsely (first estimation processing) via RSSI measurements between the reference terminals and the target terminals, and are further estimated (second estimation processing) via additional use of RSSI information measured between the target terminals. Through this processing, the position estimation accuracy of the target terminals is improved.

This type of position estimation system needs multiple reference terminals positioned at fixed coordinates. Accordingly, only the positions of target terminals within the communication coverage of the reference terminals can be estimated. Thus, if the positioning area is widened, or the number of target terminals increases, a greater number of reference terminals needs to be provided. In addition, for the second estimation processing of the position estimation system, estimation processing needs to be repeated until the results are converged. For this reason, the amount of calculation is significant, and convergence itself is not assured.

DETAILED DESCRIPTION

Hereinafter, embodiments will be described with reference to the drawings. According to the recent development of communication technology, the concept of Internet Of Things (IoT) has been popular. IoT is a system providing services where various types of electronic apparatuses are connected to the network. One of the main techniques supporting the IoT technique is a wireless communication technique. By connecting electronic apparatuses in our vicinity via wireless communication, devices can be effectively operated or controlled. An important element for the technique is to distinguish positions of respective electronic apparatuses. Determination or analysis of the positions of wirelessly connected electronic apparatuses can be effectively utilized for improving efficiency in systems, data utilization in marketing, or creation of new applications.

Conventionally, Global Positioning System (GPS) has been well-known as a wireless technique to distinguish the positions of devices. In general, it is difficult to use the GPS inside the buildings. A technique that uses information of Received Signal Strength Indicator (RSSI) or Time of Arrival (ToA) of a wireless signal for distinguishing the positions of wireless terminals inside the buildings is already known. The propagation distance of a radio wave can be calculated based on RSSI or ToA of a wireless signal obtained as a result of wireless communications between a terminal whose position is to be estimated and reference electronic apparatuses disposed at predetermined positions. Accordingly, the position of a terminal can be estimated via the multipoint measurement principle by obtaining RSSI or ToA through wireless communications between a target terminal and multiple electronic apparatuses. However, if the electronic apparatuses are disposed at fixed coordinates, only the position of a terminal positioned within a communication coverage of the electronic apparatuses can be distinguished. An application for IoT is assumed to be applied to wireless networks in large-scale warehouses, factories, or office buildings. In such an application, it is not practical to dispose electronic apparatuses at fixed coordinates in an extensive range.

Embodiments will be described below. In the following descriptions, it is assumed that two-dimensional coordinates of a terminal are estimated for simplification; however, three-dimensional coordinates of a terminal can be estimated via a similar processing.

According to one embodiment, an electronic apparatus includes communication circuitry and processing circuitry. The commnication circuitry receives a first wireless signal from a first terminal when the electronic apparatus moves on a path and reaches a first measurement point on the path. The commnication circuitry receives a second wireless signal from a second terminal when the electronic apparatus moves on the path and reaches a second measurement point on the path. The commnication circuitry receives a third wireless signal from the first terminal when the electronic apparatus moves on the path and reaches a third measurement point on the path. The commnication circuitry receives a fourth wireless signal from the second terminal when the electronic apparatus moves on the path and reaches a fourth measurement point on the path. The processing circuitry estimates one or more first candidates of a position of the first terminal and one or more second candidates of a position of the second terminal, based on information related to the first to fourth wireless signals and positions of the first to fourth measurement points. The processing circuitry specifies the position of the first terminal based on the one or more first candidates and information related to a fifth wireless signal communicated between the first terminal and the second terminal. The processing circuitry specifies the position of the second terminal based on the one or more second candidates and the information related to the fifth wireless signal communicated between the first terminal and the second terminal.

First Embodiment

Figure 1:
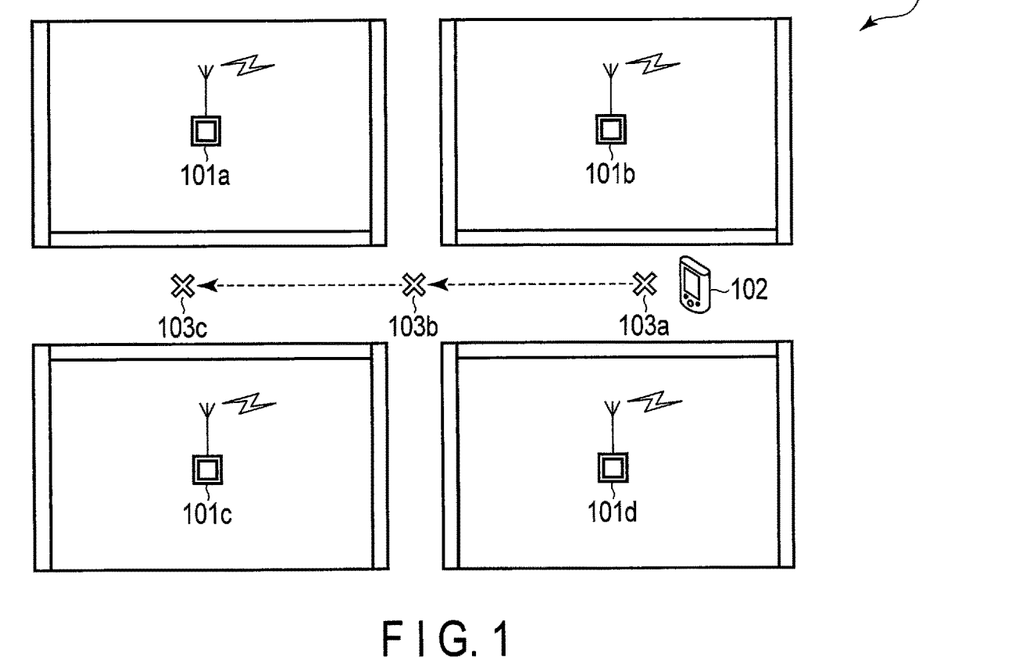
FIG. 1 is a diagram showing a configuration example of a system according to the first embodiment.

FIG. 1 is a diagram showing a configuration example of a system according to the first embodiment. A system 1 includes terminals 101a, 101b, 101c, and 101d targeted for position estimation, and an electronic apparatus 102. FIG. 1 illustrates four terminals 101a to 101d; however, the number of terminals may be two or more. Namely, the number of terminals may be two, three, or five or more.

The terminals 101a to 101d are IoT terminals possessing a function of wireless communication. It is sufficient that the terminals 101a to 101d are configured to be communicable with the electronic apparatus 102 and communicable bi-directionally. The terminals 101a to 101d may be a type of lighting, a household appliance such as an air conditioner etc., an output unit such as a printer etc., a robot, a fire extinguishing facility such as a sprinkler, an extinguisher etc., or an emergency facility etc., possessing a wireless communication function.

The electronic apparatus 102 is a device that has a wireless communication function and is movable. The electronic apparatus 102 may be moved by a user, or by autonomous movement of the electronic apparatus 102. The electronic apparatus 102 may be a portable PC, tablet, smartphone, or a specific terminal used by a security guard or a maintenance worker, etc. The electronic apparatus 102 may be an automatic robot or vehicle, etc.

As stated above, the terminals 101a to 101d perform wireless communications with the electronic apparatus 102.

The terminals 101a to 101d perform wireless communications with at least one terminal other than itself. The method of wireless communications is not limited; however, it is preferable to apply a low-power consumption type for IoT terminals. It is assumed that Bluetooth (registered trademark) Low Energy (Bluetooth 4.0 or later), or IEEE 802.15.4, etc. may be used as a wireless communication method that realizes low-power consumption and has been widely used.

The electronic apparatus 102 performs wireless communications with the terminals 101a to 101d while passing through a measurement point 103a, a measurement point 103b, and a measurement point 103c. Coordinate information of the measurement points 103a to 103c is already known from the map information or the previous measurement, etc. The number of measurement points need not to be three as shown in FIG. 1. The measurement points may be at least two points: measurement point 103a and measurement point 103b. A flexible system of configuration may be realized by setting measurement points in accordance with the size of a target measurement area or the number of target terminals for position estimation. In the case where a two-dimensional position of a terminal is estimated, provision of at least three measurement points allows improvement of accuracy. In the case where a three-dimensional position of a terminal is estimated, provision of at least four measurement points allows improvement of accuracy.

Figure 2:
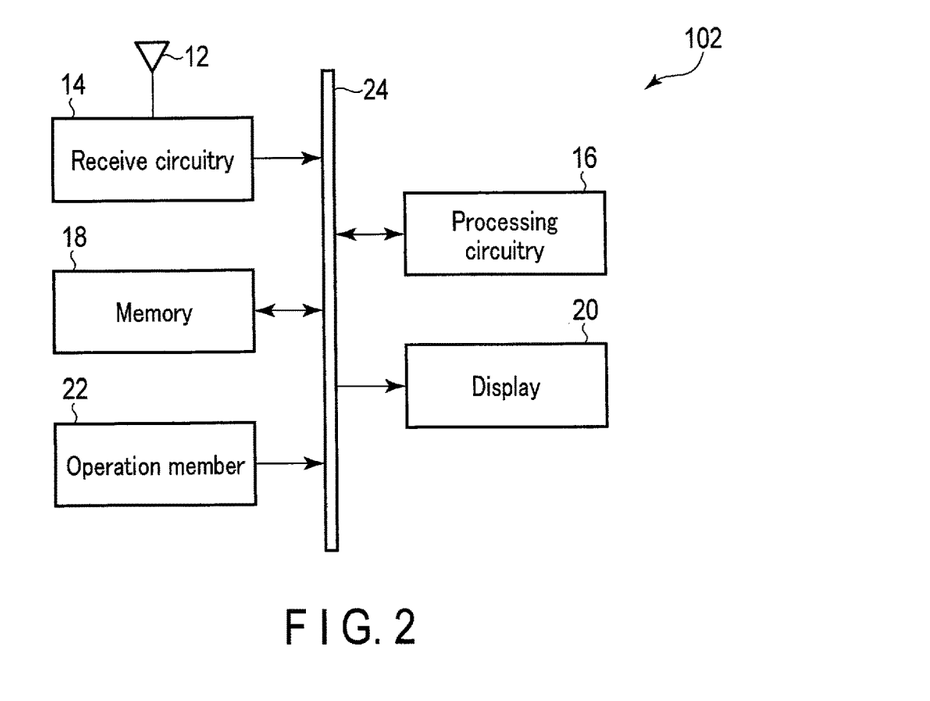
FIG. 2 is a block diagram showing the configuration of an electronic apparatus according to the first embodiment.

FIG. 2 is a block diagram showing the configuration of the electronic apparatus 102 according to the first embodiment. The electronic apparatus 102 includes an antenna 12, receive circuitry 14, processing circuitry 16, a memory 18, a display 20, and an operation member 22. The receive circuitry 14, the processing circuitry 16, the memory 18, the display 20, and the operation member 22 are coupled to allow data communication via a bus 24, for example. FIG. 2 shows the basic configuration of the electronic apparatus 102. The electronic apparatus 102 may possess an element other than the elements shown in FIG. 2, or may eliminate part of the elements shown in FIG. 2. For example, if the electronic apparatus 102 is an autonomously movable device, such as a robot, etc., the electronic apparatus 102 has a moving mechanism for autonomous movement. If the electronic apparatus 102 is a device which is not assumed to be operated by a user, the electronic apparatus 102 may eliminate the display 20 and the operation member 22. In addition, the electronic apparatus 102 may possess transmit circuitry.

The antenna 12 receives wireless signals emitted from the terminals 101a to 101d. The antenna 12 may be any antenna that is capable of receiving radio wave emitted from the terminals 101a to 101d.

The receive circuitry 14 performs the required receive processing to a wireless signal received by the antenna 12 and outputs the processed signal. The receive circuitry 14 includes demodulation circuitry, filtering circuitry, etc.

The processing circuitry 16 is constructed, for example, by hardware such as a processor, etc. The processor of the processing circuitry 16 may be a CPU, an ASIC, an FPGA, or a DSP, for example. The processor may be either a single processor or multiple processors. The processing circuitry 16 estimates the positions of terminals 101a to 101d by using wireless signals output from the receive circuitry 14. The position estimation processing will be explained in detail later.

The memory 18 includes a RAM which is a volatile memory, and a ROM which is a nonvolatile memory. The RAM temporarily stores data used for various types of processing at the processing circuitry 16. The ROM stores a program for executing various types of processing at the processing circuitry 16. The program includes a program for position estimation processing. The memory 18 may be either a single memory or multiple memories.

The display 20 is a display element such as a liquid crystal display and an organic EL display. The display 20 displays various types of images under control of the processing circuitry 16.

The operation member 22 includes various types of operation members through which a user operates the electronic apparatus 102. The operation member 22 may include mechanical operation members such as a button, a switch, a dial, etc. The operation member 22 may include an operation member such as a touch panel, etc. The touch panel may be formed integrally to the display 20, or separately from the display 20.

Figure 3:
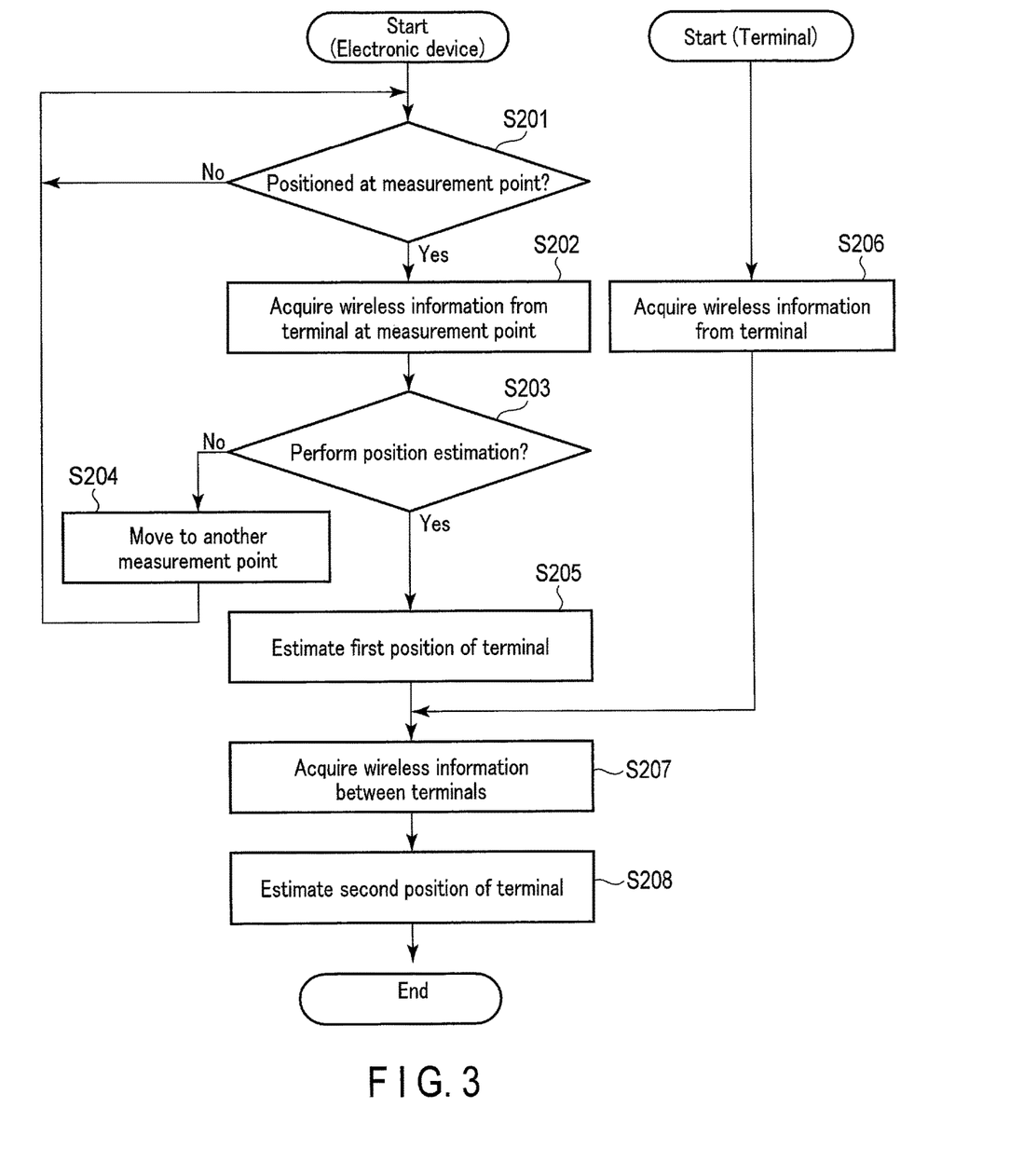
FIG. 3 is a flowchart of the position estimation processing of a terminal according to the first embodiment.

FIG. 3 is a flowchart of the position estimation processing of a terminal according to the first embodiment. The processing shown in FIG. 3 is basically performed by the processing circuitry 16 of the electronic apparatus 102. It should be noted that FIG. 3 includes processing performed by terminals 101a, 101b and 101c (S206).

First, the processing circuitry 16 determines whether or not the electronic apparatus 102 is positioned at a measurement point (S201). For example, a user moves the electronic apparatus 102 to any one of the measurement points 103a-103c. Thereafter, the user presses a specific button of the operation member 22 when reaching measurement point to instruct the electronic apparatus 102 to start the position estimation. The processing circuitry 16 determines that the electronic apparatus 102 is positioned at a measurement point when the instruction of starting position estimation is received. Alternatively, if the electronic apparatus 102 possesses a camera, the processing circuitry 16 may determine that the electronic apparatus 102 is positioned at a measurement point when image information including the measurement point is captured by the camera. If the measurement points are configured to emit radio waves, the processing circuitry 16 may determine that the electronic apparatus 102 is positioned at a measurement point when radio waves are received from the measurement point. The processing circuitry 16 may determine whether the electronic apparatus 102 is positioned at a measurement point based on the map information, etc. including coordinates of the measurement points. The method of determining whether the electronic apparatus 102 is positioned at a measurement point is not limited to a specific method. In S201, if it is determined that the electronic apparatus 102 is positioned at a measurement point, the processing proceeds to S202. In S201, if it is determined that the electronic apparatus 102 is not positioned at a measurement point, the processing is put on standby.

The processing circuitry 16 receives a wireless signal from a terminal through the antenna 12, and acquires wireless information from the received wireless signal. The memory 18 stores the acquired wireless information and the coordinates of the measurement point that are associated with each other (S202). Here, the wireless information includes an ID of a terminal and information usable for position estimation. The information usable for position estimation includes Time Difference of Arrival (TDoA), Angle of Arrival (AoA), Angle of Departure (AoD) etc. in addition to the aforementioned RSSI and ToA. Either one or multiple types of information may be used. The distance and the direction from the measurement point to a terminal can be estimated based on the information. In the following descriptions, it is assumed that a terminal ID and RSSI are acquired. Measurement of RSSI is simple and can be implemented by simple hardware.

In S202, it is not necessarily the case that the processing circuitry 16 acquires wireless information from all of the terminals at all the measurement points. However, it is necessary that wireless information has been acquired from at least at two measurement points for each terminal at the time when the electronic apparatus 102 has passed all the measurement points to acquire wireless information. For example, in the case where the number of the terminals is two, and if the number of the measurement points is two (a first measurement point and a second measurement point), wireless information may be acquired from two terminals at each of the first and second measurement points. Alternatively, if the number of the measurement points is four (a first measurement point; a second measurement point; a third measurement point; and a fourth measurement point), wireless information may be acquired from one terminal at the first and third measurement points, and wireless information may be acquired from the other terminal at the second and fourth measurement points.

In S202, the electronic apparatus 102 receives a wireless signal from a terminal. However, a terminal may receive a wireless signal from the electronic apparatus 102. In this case, the wireless information acquired by the terminal may be sent back to the electronic apparatus 102, or the information acquired by the terminal may be transferred to an external server for position estimation. The subsequent processing described in FIG. 3 is also not necessarily performed by the electronic apparatus 102. In the following descriptions, it is assumed that a terminal transmits a wireless signal, and the electronic apparatus receives the wireless signal.

After storing the wireless information, the processing circuitry 16 determines whether or not to perform position estimation of a terminal (S203). This determination is performed based, for example, on whether terminal IDs of all the terminals targeted for position estimation have been acquired, whether the number of measurement points from which a wireless signal has been received is sufficient, whether the variation of measured RSSI affects the estimation, etc. For example, if the terminal IDs of all the terminals targeted for position estimation have been acquired, the number of measurement points is sufficient, and there is no influence of the variation of measured RSSI, it is determined that the position estimation is performed for the terminal.

In S203, if it is determined that position estimation is not performed (S203: No), the processing circuitry 16 performs the required processing to move the electronic apparatus 102 to another measurement point (S204). For example, if the electronic apparatus 102 can autonomously move, the processing circuitry 16 directs the electronic apparatus 102 to move to another measurement point. On the other hand, if the electronic apparatus 102 cannot autonomously move, the processing circuitry 16 suggests a user etc., who possesses the electronic apparatus 102, to move the electronic apparatus 102 to another measurement point through display indication, etc. Thereafter, the processing proceeds to S201. In this case, wireless information is acquired at the other measurement point reached by the electronic apparatus 102. The determination in S203 is not necessarily performed for each measurement point. The determination in S203 may be performed after wireless information is consecutively acquired at multiple points.

In S203, if it is determined that terminal position estimation is performed (S203: Yes), the processing circuitry 16 estimates a first position of each of terminals 101a to 101d based on the wireless information stored in the processing circuitry 16 (S205). The first position is represented by candidate coordinates (first candidate and second candidate) of one or more estimated positions where each of the terminals 101a to 101d is placed. Alternatively, the first position may include reliability information in addition to the information on the candidate coordinates. The method of calculating the candidate coordinates is not limited, but may apply, for example, maximum likelihood estimation, least squares (LS) method, Newton method, or path model matching. Here, the case of using path model matching is described as an example. It is assumed that coordinates of i-th measurement point is [Xi, Yi] (known coordinates), and an observation value of RSSI received from a terminal of "ID1" (hereinafter referred to as "terminal #1") is Ri [dBm], candidate coordinates of terminal #1, [X(1), Y(1)], are obtained by the following equations:

$$R_i = P - \alpha \cdot Log(D_i) + N_i \quad (1)$$

$$D_i = \sqrt{(X_i - X^{(1)})^2 + (Y_i - Y^{(1)})^2} \quad (2)$$

Here, $D_i$ represents the distance between terminal #1 and i-th measurement point, P represents a transmission power of terminal #1, $\alpha$ is a factor representing an attenuation degree of the wireless propagation path, and $N_i$ represents an influence of thermal noise and disturbance (hereinafter referred to as "noise"). There are cases in which P and a are either known, or unknown, depending on the application assumed to be used. If P and a are unknown, they can be set by performing linear approximation of the propagation characteristics of equation (1) based on the observation data at multiple measurement points, estimating using the map data of the measurement area, or calculating by electromagnetic field analysis simulation. The number of the obtained relational expressions of equations (1) and (2) is the same as the number of wireless information items obtained for all the measurement points. Accordingly, the candidate coordinates of each terminal can be calculated by solving the simultaneous equations generated by the relational expressions of equation (1) obtained for each measurement point.

Figure 4:
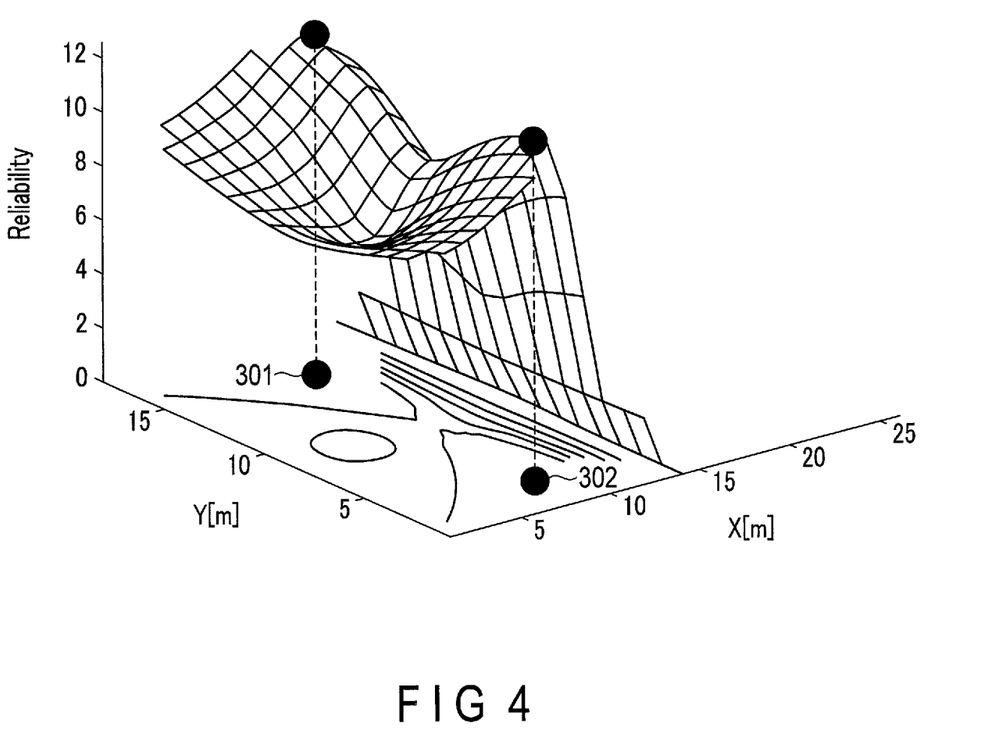
FIG. 4 illustrates an example of the result of estimation processing for a first position according to the first embodiment.

In the case where the number of the measurement points is less, or an influence of noise is significant, it may not be possible to obtain a unique solution. For example, FIG. 4 illustrates an example of an estimation result in the case where a first position is estimated using wireless signals from terminal 101a at three measurement points 103a-103c shown in FIG. 1. The X-axis and the Y-axis represent estimated coordinates of terminal 101a, and the Z-axis represents reliability of the estimation processing.

In FIG. 4, a peak of reliability is observed at two different points, point 301 and point 302. Accordingly, it is considered that either point 301 or point 302 represents coordinates of terminal 101a, but it cannot be determined which of them represents the correct coordinates. This is because three measurement points 103a-103c where RSSI is measured are positioned on a straight line, and it is not possible to narrow the arrival directions of radio waves into one direction. As can be seen from the above, in the case where positional relationships between measurement points are not appropriate, or the number of the measurement points is less, there is a possibility that coordinates completely different from the actual coordinates may be estimated. If the number of measurement points is sufficiently large, such ambiguity can be decreased. However, the processing time and the cost for position estimation may increase proportionally to the number of the measurement points.

Accordingly, in the present embodiment, the processing circuitry 16 calculates a plurality of candidate coordinates without narrowing the estimation results to particular coordinates when position estimation is performed to each terminal in S205. In the example of FIG. 4, the processing circuitry 16 calculates coordinates of point 301 and point 302 as candidate coordinates, and stores them in the memory 18. Only coordinates whose reliability of estimation processing is equal to or greater than a threshold value may be stored in the memory 18. The calculation method of reliability is not limited. For example, a reciprocal of noise Ni of equation (1) may be calculated as reliability, or a reciprocal of least square error (LSE) obtained by the LS method may also be calculated as reliability.

Independently from S201 to S205, wireless information (ID and RSSI) is measured between terminals (S206). Each terminal performs wireless communication with at least one terminal other than itself, and stores wireless information of a communication counterpart terminal. The processing in S206 is performed independently from the processing in S201 to S205. Accordingly, S206 may be performed in parallel to S201 to S205, prior to S201 to S205, or after S201 to S205, but prior to S207. In either case, the processing circuitry 16 acquires wireless information obtained in S206 from terminals (S207). In this case, wireless information from each terminal may be gathered at a particular terminal (for example, terminal 101a), and transmitted to the electronic apparatus 102. Alternatively, wireless information from each terminal may be shared by all terminals and transmitted to the electronic apparatus 102 from any one of the terminals. In addition, wireless information from a communication counterpart terminal of each terminal may be also transmitted to the electronic apparatus 102 in S207. The processing in S207 may be performed prior to S201 to S205, or in-between S201 to S205.

After the wireless information obtained through wireless communication between terminals is acquired, the processing circuitry 16 determines a second position, which comprises the final coordinates of each terminal based on the wireless information and the first position (candidate coordinates) of each terminal estimated in S205 (S208). The estimation of the final coordinates is performed by selecting, as a first position, the most likely coordinates from among multiple candidate coordinates. The index of likelihood may be a matching difference between the distance information between candidate coordinates and RSSI measured between target terminals. Here, the processing behind the calculation of the final coordinates of a terminal will be explained with reference to FIG. 5. In the following descriptions, it is assumed that the candidate coordinates of the first position for each of terminals 101a to 101d are obtained as indicated below.

Figure 5:
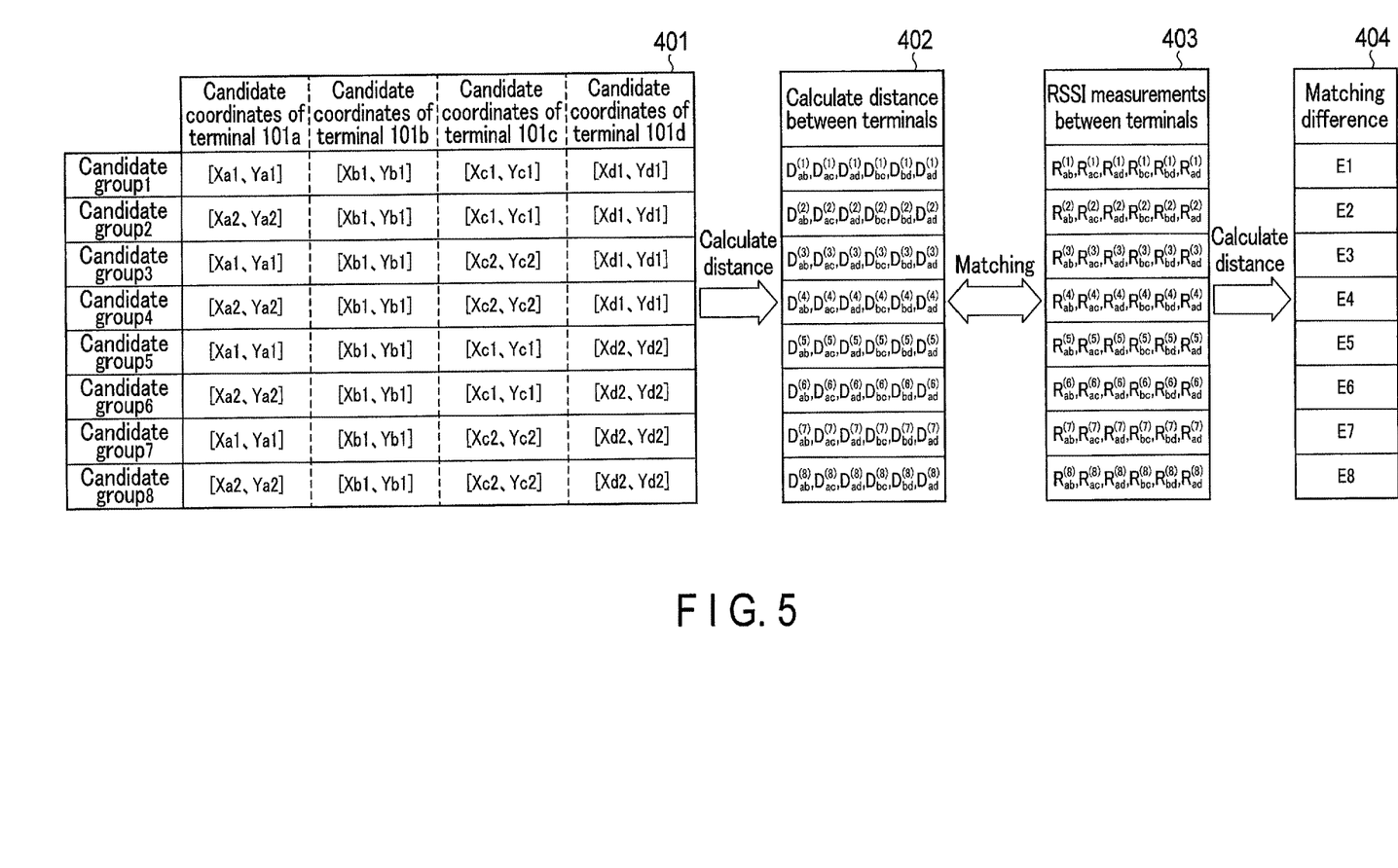
FIG. 5 illustrates an example of data used for estimation processing of a second position according to the first embodiment.

Candidate coordinates of terminal 101a: [Xa1, Ya1], [Xa2, Ya2] (two points)
Candidate coordinates of terminal 101b: [Xb1, Yb1] (one point)
Candidate coordinates of terminal 101c: [Xc1, Yc1], [Xc2, Yc2] (two points)
Candidate coordinates of terminal 101d: [Xd1, Yd1], [Xd2, Yd2] (two points)

In this example, the number of combinations of candidate coordinates is
2 (points)×1 (points)×2 (points)×2 (points)=8. Namely, the processing circuitry 16 lists eight candidate groups. The listed candidate groups are indicated in table 401 of FIG. 5. Subsequently, the processing circuitry 16 selects two coordinates from among coordinates of four terminals included in each candidate group, and calculates the distance between the selected terminals. The calculated distances are indicated in table 402 of FIG. 5. For example, the distance between the candidate coordinates of terminal 101a and the candidate coordinates of terminal 101b in candidate group 1 is calculated by:

$$D_{ab}^{(1)} = \sqrt{(X_{a1}-X_{b1})^2 + (Y_{a1}-Y_{b1})^2} \qquad (3).$$

Figure 6:
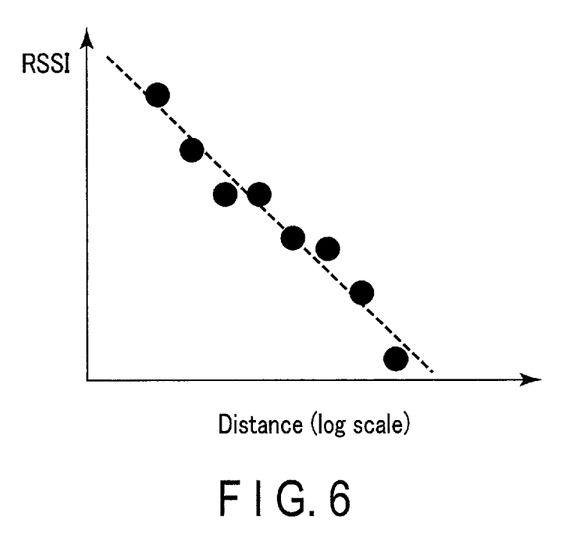
FIG. 6 illustrates an example relationship between a propagation distance and a received power measurement in wireless propagation.

Since there are four terminals, the number of distances $D_{ij}$ (i=a or b or c or d, j=a or b or c or d, i≠j) between the selected terminals is $_4C_2$=6. In table 402, a=terminal 101a, b=terminal 101b, c=terminal 101c, and d=terminal 101d. Subsequently, the processing circuitry 16 calculates a matching difference by performing matching between the obtained distances $D_{ij}$ and the actual measured RSSI between the selected terminals (table 403). The calculated matching differences are indicated in table 404. The matching difference may be calculated based on a difference or an approximation difference, etc., between the distances $D_{ij}$ and measured RSSI. In general, RSSI in the wireless propagation decreases with the length of the propagation distance, and accordingly, the propagation distance increases negative proportional to RSSI. Specifically, as shown in FIG. 6 and equation (1), it is well-known that the propagation distance and RSSI plotted on a log scale shows a linear relationship.

Accordingly, the matching difference can be obtained by using this relationship. For example, the matching difference may be obtained by the distances shown in table 402 and the measured values shown in table 403, or may be obtained by an approximation difference when the measurement result of RSSI and the propagation distance of a terminal are linear approximated, as shown in FIG. 6. In FIG. 6, the measurement results for eight points have been obtained. The results include the results of RSSI measurement at each measurement point between the electronic apparatus 102 and a particular terminal (for example, terminal 101*a*), and the results of RSSI measurement between the particular terminal and other terminals (for example, terminals 101*b*, 101*c*, and 101*d*).

As stated above, the processing circuitry 16 calculates a matching difference for each of all the candidate groups, and determines a candidate coordinate group which has the minimum matching difference as the final coordinates of each terminal. Alternatively, the processing circuitry 16 may determine a weighted sum of estimated candidate coordinates with the matching difference used as a weight, as the final coordinates.

As described above, according to the first embodiment, the electronic apparatus 102 receives wireless signals from terminals and estimates positions of the terminals, while passing through multiple measurement points. Accordingly, the positions of the terminals can be estimated regardless of the number of the terminals or the size of measurement area.

In addition, according to the present embodiment, unique coordinates can be calculated from candidate coordinates. It is advantageous for the calculation amount to be less since the matching difference is merely calculated for each candidate coordinate group. In addition, there is no repetitive processing, and accordingly, there is no need to account for convergence of calculation. Furthermore, the positions of terminals can be estimated even with a small number of measurement points, and a small amount of wireless information. As stated above, if the number of measurement points or the amount of wireless information is less, the results of position estimation may include ambiguities. However, in the present embodiment, multiple candidate coordinates are calculated with ambiguity, and true final coordinates are determined from the candidate coordinates. Accordingly, the possibility of ambiguities being included by the results of position estimation can be reduced.

In the present embodiment, it is assumed that the electronic apparatus 102 performs position estimation processing. Alternatively, the position estimation processing may be performed by a measurement server provided separately from the electronic apparatus 102. In this case, the wireless information acquired by the electronic apparatus 102 and the wireless information measured between terminals are transmitted to the measurement server. The measurement server performs position estimation processing as shown in S205 and S208 of FIG. 3, in accordance with the wireless information acquired by the electronic apparatus 102 and the wireless information measured between terminals. The results of position estimation obtained at the measurement server are notified to the electronic apparatus 102 from the measurement server, for example. Alternatively, the results of position estimation may be confirmed by a user accessing the measurement server via a network.

Second Embodiment

The second embodiment will be described. The configuration of the system as shown in FIG. 1 is applied. The configuration of the electronic apparatus 102 as shown in FIG. 2 is applied.

Figure 7:
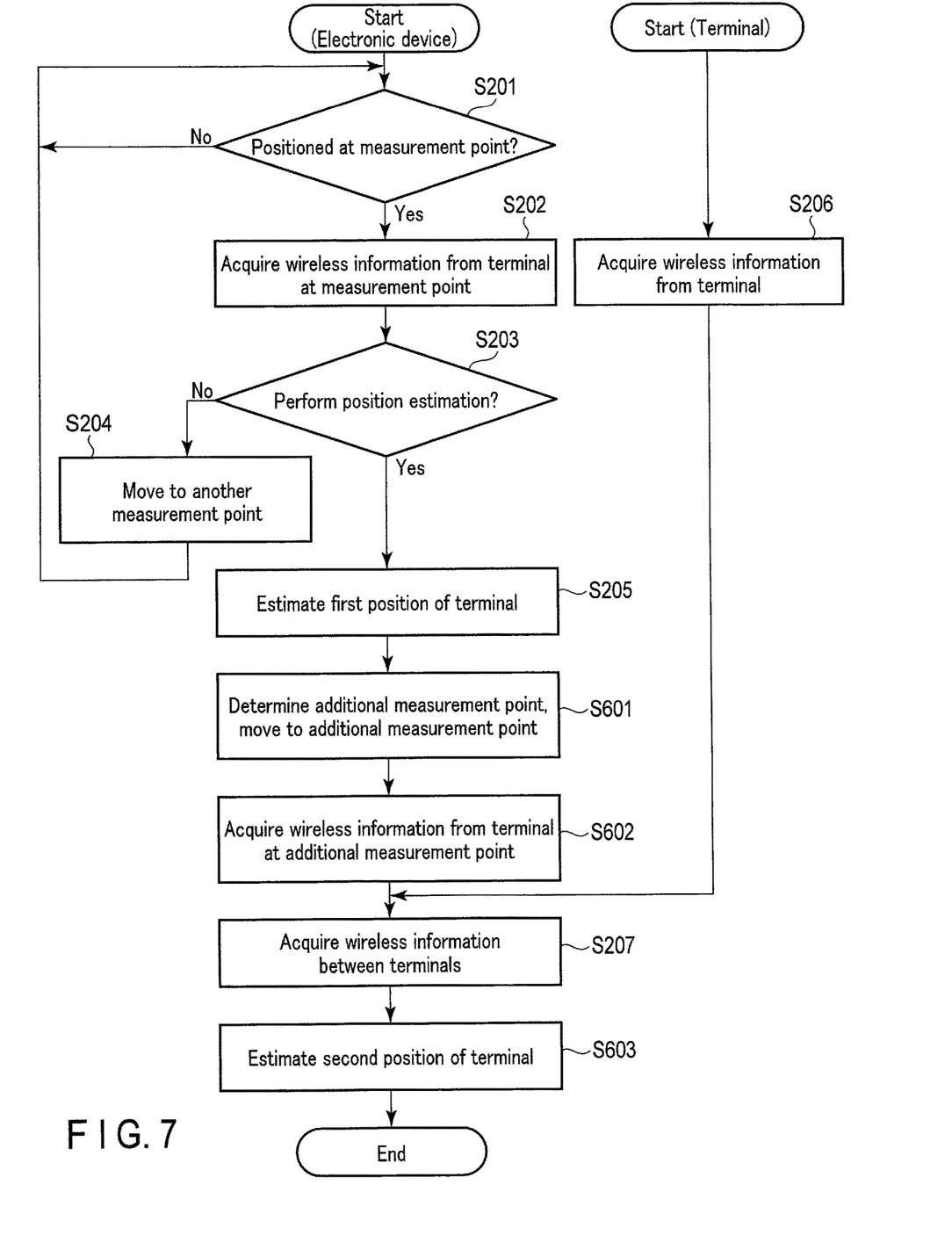
FIG. 7 is a flowchart of an example position estimation method according to the second embodiment.

FIG. 7 is a flowchart of the position estimation processing of terminals in the second embodiment. The flowchart of FIG. 7 includes S601, S602 and S603 in addition to the flowchart of FIG. 3 explained in the first embodiment. There is no other difference between FIGS. 3 and 7. In the second embodiment, the processing circuitry 16 estimates a first position of a terminal based on the wireless information (for example, ID and RSSI) between the electronic apparatus 102 and the terminal, and thereafter, determines a point where additional wireless information should be measured, and performs measurement of the wireless information at the determined position. Through this processing, the accuracy of position estimation is improved.

The processing will be described with reference to the flowchart of FIG. 7. First, the processing circuitry 16 acquires wireless information (ID and RSSI) from a wireless signal received from a terminal at multiple measurement points, and stores the acquired wireless information and the coordinates of measurement points in the memory 18 (S201 to S204). Thereafter, the processing circuitry 16 calculates the first position of each terminal based on the stored wireless information (S205). The processing stated above is the same as that in the first embodiment.

After calculation of the first position, the processing circuitry 16 determines a point where additional wireless information is to be measured based on multiple candidate coordinates that can be the first position.

Thereafter, the processing circuitry 16 performs the required processing to move the electronic apparatus 102 to an additional measurement point (S601). Subsequently, the processing circuitry 16 receives a wireless signal from each terminal at the added measurement point, and acquires wireless information (S602).

The method for determining an additional measurement point may include selecting a position where the ambiguity included in the first position (candidate coordinates) estimated in S205 is reduced, for example. For example, as shown in FIG. 4, in the case where points 301 and 302 may be a first position of a terminal, the processing circuitry 16 selects either point 301 or point 302 as an additional measurement point, and additionally measures wireless information at the selected point. Through this processing, the ambiguity in the estimated position relative to the terminal can be reduced. Prior to performing additional measurement, points 301 and point 302 substantially have the same degree of reliability. However, as additional measurement is performed at either point, it is likely that the reliability distribution may change. The additional measurement point is not limited exactly to point 301 or point 302, but may be a point close to point 301 or point 302.

Alternatively, only a direction where additional measurement is to be performed may be determined. For example, in FIG. 4, it is apparent that the reliability of an area where X<15 is higher than an area where X>15, relative to the X-axis. On the other hand, the reliability of an area where Y<10 is substantially the same degree as that of an area where Y>10, relative to the Y-axis. Accordingly, the processing circuitry 16 determines a direction where additional measurement is performed as Y direction, and performs processing required for moving the electronic apparatus 102. Thereafter, the processing circuitry 16 performs additional measurement of wireless information after the electronic apparatus 102 has moved in the Y direction. Through this processing, the possibility that ambiguity relative to the Y-axis is reduced will be increased.

FIG. 4 illustrates the case where two candidate coordinates whose reliability is ambiguous are obtained. In the case where three or more candidate coordinates are obtained, an additional measurement point is determined in a similar manner. For example, in the case where three candidate coordinates are obtained, any one of the three candidate coordinates may be selected as an additional measurement point. Alternatively, a direction where ambiguity relative to the X-axis or the Y-axis is expected to be reduced may be determined as a direction of additional measurement.

As stated above, according to the second embodiment, an additional measurement point is suitably determined so that the ambiguity in candidate coordinates can be reduced. Through this processing, the accuracy of final position estimation is expected to be improved.

The processing in S601 and S602 shown in FIG. 7 may be repeated multiple times. Namely, selection of an additional measurement point, determination of an additional measurement point, and movement to the additional measurement point may be repeated multiple times. The repetition of the above processing is effective in the case where the number of candidate coordinates for each terminal is large, and reduction of ambiguity seems difficult.

In S601, to correctly move the electronic apparatus 102 to an additional measurement point, it is necessary to correctly distinguish whether the coordinates of the destination point are the coordinates of a desired point, in a similar manner to S201 of FIG. 3. The method of correctly distinguishing the coordinates may be a method of using the image information, or a method of using the map information, as explained in S201. The method of distinguishing the coordinates of the additional measurement point is not limited to a particular method.

Similar to the first embodiment, in the second embodiment, measurement of wireless information (ID and RSSI) is performed between terminals, independently from S201 to S205 and S601 and S602 (S206). The processing in S206 is performed independently from the processing in S201 to S205 and S601 and S602. Accordingly, S206 may be performed in parallel to S201 to S205 and S601 and S602, prior to S201 to S205 and S601 and S602, or after S201 to S205 and S601 and S602, but prior to S207. In either case, the processing circuitry 16 acquires wireless information obtained in S206 from terminals (S207). The processing in S207 may be performed prior to S201 to S205 and S601 and S602, or in-between S201 to S205 and S601 and S602.

Thereafter, the processing circuitry 16 estimates the final coordinates based on the already obtained information of the first position, additionally measured wireless information, and wireless information between terminals (S603). The estimation method may be similar to the method explained with reference to FIGS. 5 and 6 in the first embodiment. The second embodiment differs from the first embodiment in that wireless information obtained by additional measurement can be used. Since wireless information measured at a point where the ambiguity in estimated coordinates of a terminal can be reduced is added, the accuracy of position estimation is expected to be improved.

Third Embodiment

Figure 8:
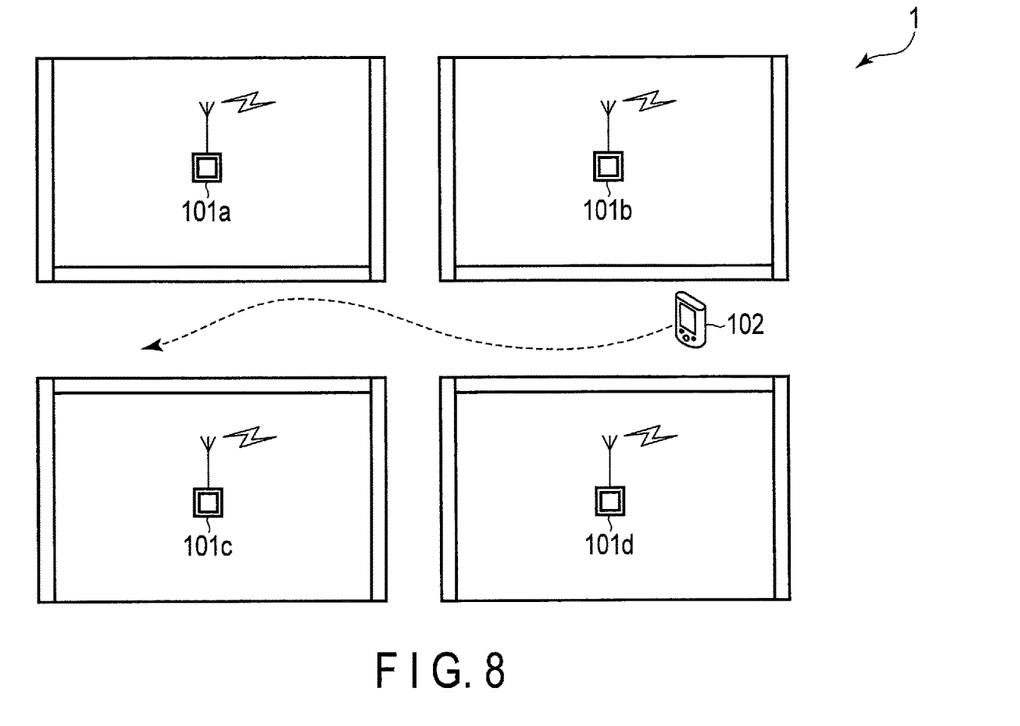
FIG. 8 is a diagram showing a configuration example of a system according to the third embodiment.

The third embodiment will be described. FIG. 8 illustrates a configuration example of a system according to the third embodiment. In comparison with FIG. 1, FIG. 8 does not have measurement points 103a-103c. Instead of providing the measurement points, the electronic apparatus 102 has a function of detecting its own position.

Figure 9:
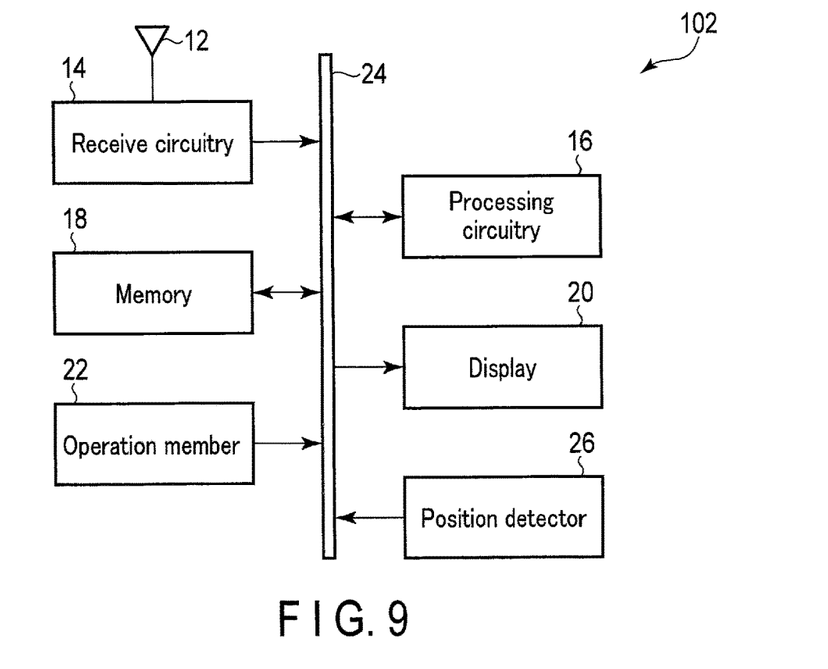
FIG. 9 is a block diagram showing the configuration of an electronic apparatus according to the third embodiment.

FIG. 9 is a block diagram showing the configuration of the electronic apparatus 102 according to the third embodiment. FIG. 9 differs from FIG. 2 in that the electronic apparatus 102 has a position detector 26. The position detector 26 may be a gyro sensor, an accelerometer, an electronic compass, etc., and detect a position of the electronic apparatus 102. The position detector 26 may be a camera having an image sensor such as a CMOS sensor, etc. In this case, the processing circuitry 16 detects a position of the electronic apparatus 102 from the image information acquired by the position detector 26. The position detector 26 may be a radar. In the case where the electronic apparatus 102 has an autonomous movement mechanism, the position detector 26 may be a sensor that detects a driving amount (the rotation angle of a wheel, etc.) of the movement mechanism. In this case, the processing circuitry 16 detects a position of the electronic apparatus 102 by odometry. As stated above, the configuration of the position detector 26 is not limited to a particular configuration, but necessarily has a function of detecting a position of the electronic apparatus 102.

According to the third embodiment, the electronic apparatus 102 has a function of detecting its own position, and accordingly, there is no need to set measurement points in advance. Thus, the electronic apparatus 102 can perform position estimation at a discretionary point while moving within the measurement area. This is especially effective in the case where the number of terminals targeted for position estimation is large, or the measurement area is extremely wide. The position estimation processing of the first embodiment or the second embodiment can be essentially applied. The third embodiment differs from the first or second embodiment only in that wireless information is measured at a discretionary point, while wireless information is measured at a predetermined measurement point in the first or second embodiment. Namely, in the third embodiment, the coordinates of a point where measurement is performed are associated with the wireless information, and the associated coordinates and wireless information are stored in the memory 18.

Due to the detection of its own position by using the position detector 26, there is a possibility that detection errors are accumulated. In this case, the accumulation of errors can be mitigated by reducing the error by using the map information of the measurement area, or using multiple sensors, or by resetting the error at a particular landmark point.

Fourth Embodiment

The fourth embodiment will be described. In the first and second embodiments, it is important that wireless information is correctly acquired at measurement points of known coordinates. In particular, in the case where a user, etc. carries the electronic apparatus 102, there may be a case where the user cannot correctly move to the measurement points. In the fourth embodiment, "the points where measurement is to be performed", or "the path where the user moves" is notified to the user, etc. Such notification is performed by the display 20 acting as a notification unit, for example.

Figure 10:
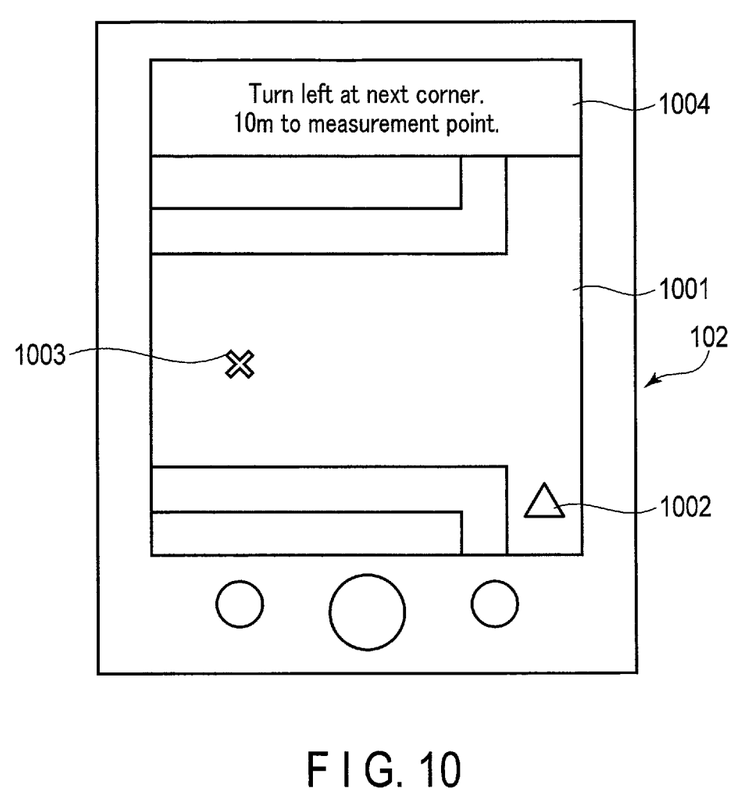
FIG. 10 illustrates an example of navigation display according to the fourth embodiment.

FIG. 10 illustrates an example of navigation display as an example of notification. As shown in FIG. 10, in the navigation display, a map image 1001 around a user who possesses the electronic apparatus 102 is displayed. On the map image 1001, a marker 1002 indicating a position and an orientation of a user on the map is displayed. By the position of the marker 1002 on the map image 1001, the user can determine the user's current own position. In addition, on the map image 1001, a marker 1003 indicating a measurement point toward which the user is expected to move is displayed. The scale of the map image may be changed in accordance with the distance between the user and the measurement point. For example, if the distance between the user and the measurement point is short, a large-scaled map image may be displayed, and if the distance between the user and the measurement point is long, a small-scaled map image may be displayed. In the navigation display, route information 1004 which guides the distance and the direction where the user is expected to head is displayed. The route information 1004 is successively updated.

FIG. 10 merely illustrates an example, and the way of display is not limited if it can guide the user to the measurement points. In the navigation display, the results of measurement at the measurement points, such as "OK" or "NG", or the reliability of measurement, etc. may also be displayed. FIG. 10 shows a guidance of visual display. However, a guidance of audio display may be used in addition to the visual display. It may be possible that an alert sound is generated, an LED is turned on, or the electronic apparatus 102 is vibrated every time the user reaches a particular point on the route.

The processing of determining what is displayed on the display 20 is performed by the measurement server. The measurement server may be the electronic apparatus 102 itself, or an externally provided server. What is displayed may be determined based on the history information of the measurement results of wireless information or the measurement points, the first position of each terminal (information on candidates of estimated coordinates), etc. stored in the electronic apparatus 102. For example, in the case where signals from a particular terminal cannot be sufficiently obtained, the measurement history may be referred to, and the navigation display indicating that measurement should be performed by returning back to a position close to a measurement position where RSSI from the terminal is strong may be displayed. The accuracy of position estimation by RSSI may be easily deteriorated if the electronic apparatus 102 moves along a linear path. Accordingly, the path other than a linear path may be displayed in the navigation display. The path displayed as a navigation display may be different from the shortest route connecting the measurement points, or may be deviated from the shortest route connecting the measurement points.

As explained in the second embodiment, in the case where candidate coordinates of a terminal are remote from each other, a navigation to suggest performing measurement at a position close to either point may be displayed.

According to the fourth embodiment, the navigation indicating a route to the measurement points is displayed by the display 20, and accordingly, the user can perform effective measurement. In addition, since measurement is performed at the correct measurement points, the accuracy of position estimation relative to terminals can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
communication circuitry configured to:
receive a first wireless signal from a first terminal when the electronic apparatus moves on a path and reaches a first measurement point on the path;
receive a second wireless signal from a second terminal when the electronic apparatus moves on the path and reaches a second measurement point on the path;
receive a third wireless signal from the first terminal when the electronic apparatus moves on the path and reaches a third measurement point on the path; and
receive a fourth wireless signal from the second terminal when the electronic apparatus moves on the path and reaches a fourth measurement point on the path; and
processing circuitry configured to:
estimate two or more first candidates of a position of the first terminal and two or more second candidates of a position of the second terminal, based on information related to the first to fourth wireless signals and positions of the first to fourth measurement points; and
specify the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal.

2. The electronic apparatus according to claim 1, wherein the position of the first terminal is a position represented by positions selected from among positions included in the two or more first candidates, and the position of the second terminal is a position represented by positions selected from among positions included in the two or more second candidates.

3. The electronic apparatus according to claim 1, wherein the processing circuitry determines a fifth measurement point used for specifying the position of the first terminal based on the two or more first candidates, and further specifies the position of the first terminal based on a sixth wireless signal received from the first terminal at the fifth measurement point.

4. The electronic apparatus according to claim 1, wherein information related to the first to fifth wireless signals includes a received power value.

5. The electronic apparatus according to claim 1, wherein the processing circuitry acquires a position of the electronic apparatus, and
positions of at least one of the first to fourth measurement points are determined by the position of the electronic apparatus.

6. The electronic apparatus according to claim 1, wherein the first to fifth wireless signals include a wireless signal complying with Bluetooth (registered trademark) Low Energy standards.

7. A system comprising processing circuitry, the processing circuitry configured to: estimate two or more first candidates of a position of a first terminal and two or more second candidates of a position of a second terminal,
based on information related to a first wireless signal received from the first terminal when an electronic apparatus moves on a path and reaches a first measurement point on the path, information related to a second wireless signal received from the second terminal when the electronic apparatus moves on the path and reaches a second measurement point on the path, information related to a third wireless signal received from the first terminal when the electronic apparatus moves on the path and reaches a third measurement point on the path, information related to a fourth wireless signal received from the second terminal when the electronic apparatus moves on the path and reaches a fourth measurement point on the path, and positions of the first to fourth measurement points; and specify the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal.

8. An electronic apparatus portable by a user, comprising:

processing circuitry configured to estimate two or more first candidates of a position of a first terminal and two or more first candidates of a position of a second terminal, based on information related to a first wireless signal received from the first terminal when the electronic apparatus moves on a first path and reaches a first measurement point on the first path, information related to a second wireless signal received from the second terminal when the electronic apparatus moves on the first path and reaches a second measurement point on the first path, information related to a third wireless signal received from the first terminal when the electronic apparatus moves on the first path and reaches a third measurement point on the first path, and positions of the first to fourth measurement points, and specify the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal; and a notification unit configured to notify the user to carry the electronic apparatus along a second path different from the first path, based on the information related to the first wireless signal, the information related to the second wireless signal, the information related to the third wireless signal, and the information related to the fourth wireless signal.

9. A method for estimating a position of a first terminal and a position of a second terminal, comprising:

receiving a first wireless signal from the first terminal when an electronic apparatus moves on a path and reaches a first measurement point on the path;

receiving a second wireless signal from the second terminal when the electronic apparatus moves on the path and reaches a second measurement point on the path;

receiving a third wireless signal from the first terminal when the electronic apparatus moves on the path and reaches a third measurement point on the path;

receiving a fourth wireless signal from the second terminal when the electronic apparatus moves on a path and reaches a fourth measurement point on the path;

estimating two or more first candidates of the position of the first terminal and two or more second candidates of the position of the second terminal, based on the information of the first wireless signal, the information of the second wireless signal, the information of the third wireless signal, the information of the fourth wireless signal, and positions of the first to fourth measurement points; and specify the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal.

10. A method for estimating a position of a first terminal and a position of a second terminal, comprising: estimating two or more first candidates of the position of the first terminal and two or more second candidates of the position of the second terminal, based on information related to a first wireless signal received from the first terminal when an electronic apparatus moves on a path and reaches a first measurement point on the path, information related to a second wireless signal received from the second terminal when the electronic apparatus moves on the path and reaches a second measurement point on the path, information related to a third wireless signal received from the first terminal when the electronic apparatus moves on the path and reaches a third measurement point on the path, information related to a fourth wireless signal received from the second terminal when the electronic apparatus moves on the path and reaches a fourth measurement point on the path, and positions of the first to fourth measurement points; and specifying the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal.

11. A method for estimating a position of a first terminal and a position of a second terminal by using an electronic apparatus portable by a user, comprising: estimating two or more first candidates of a position of a first terminal and two or more first candidates of a position of a second terminal, based on information related to a first wireless signal received from the first terminal when the electronic apparatus moves on a first path and reaches a first measurement point on the first path, information related to a second wireless signal received from the second terminal when the electronic apparatus moves on the first path and reaches a second measurement point on the first path, information related to a third wireless signal received from the first terminal when the electronic apparatus moves on the first path and reaches a third measurement point on the first path, information related to a fourth wireless signal received from the second terminal when the electronic apparatus moves on the first path and reaches a fourth measurement point on the first path, and positions of the first to fourth measurement points, and specifying the position of the first terminal and the position of the second terminal based on a difference between (1) a distance between the first terminal and the second terminal which is estimated from the two or more first candidates and the two or more second candidates and (2) information related to a fifth wireless signal communicated between the first terminal and the second terminal; and notifying the user to carry the electronic apparatus along a second path different from the first path, based on the information related to the first wireless signal, the information related to the second wireless signal, the information related to the third wireless signal, and the information related to the fourth wireless signal.

* * * * *